United States Patent [19]
Milewits et al.

[11] Patent Number: 5,303,872
[45] Date of Patent: Apr. 19, 1994

[54] TRANSPORTABLE BATTERY DISPOSAL UNIT

[75] Inventors: Marvin Milewits, Sugar Land; Baldemar Fuentes, Brownsville; Dinesh R. Patel, Sugar Land, all of Tex.

[73] Assignee: Schlumberger Technology Corporation, Houston, Tex.

[21] Appl. No.: 8,247

[22] Filed: Jan. 21, 1993

Related U.S. Application Data

[63] Continuation of Ser. No. 714,957, Jun. 13, 1991, abandoned.

[51] Int. Cl.⁵ .............................................. B02C 23/40
[52] U.S. Cl. ...................................... 241/41; 241/60; 241/100; 241/101.7; 241/205; 241/DIG. 14; 241/DIG. 38
[58] Field of Search .................. 241/41, 49, 60, 99, 241/100, 101.7, 205, 277, 282.1, 283, DIG. 14, DIG. 38

[56] References Cited

U.S. PATENT DOCUMENTS

| | | | |
|---|---|---|---|
| 1,776,318 | 9/1930 | Keet | 241/205 X |
| 1,936,843 | 11/1933 | Jonsson | 241/205 X |
| 2,594,785 | 4/1952 | Meeker | 241/6 X |
| 3,614,003 | 10/1971 | Tremolada | 241/284 X |
| 3,892,563 | 7/1975 | La Point | 241/24 X |
| 4,009,833 | 3/1977 | Lott et al. | 241/14 |
| 4,018,567 | 4/1977 | La Point | 241/77 X |
| 4,267,980 | 5/1981 | La Point | 241/20 |
| 4,397,424 | 8/1983 | Zappa et al. | 241/20 |
| 4,418,872 | 12/1983 | Nelson | 241/205 X |
| 4,579,287 | 4/1986 | Brown | 241/101.7 X |
| 4,603,816 | 8/1986 | Panning | 241/266 |
| 4,637,928 | 1/1987 | Zajac et al. | 241/46.08 X |
| 4,759,508 | 7/1988 | Griffith et al. | 241/99 X |
| 4,860,958 | 8/1989 | Yeuman | 241/99 X |
| 4,917,313 | 4/1990 | Moms | 241/99 |
| 5,035,367 | 7/1991 | Nojima | 241/101.7 X |

FOREIGN PATENT DOCUMENTS

| | | | |
|---|---|---|---|
| 1505468 | 9/1989 | U.S.S.R. | 241/205 |
| 102764 | of 1916 | United Kingdom | 241/205 |

OTHER PUBLICATIONS

"First International Seminar on Battery Waste Management," dated Nov. 6–8, 1989 Review the section entitled Treatment/Neutralization. In addition, review the conclusions.

"Safety Characteristic of Lithium Primary and Secondary Battery Systems," dated Jul. 1986–Review p. 56, second paragraph.

"Safe, Not Sorry,"—article/brochure by BDT, Clarence, New York, relating to Hazardous Waste Disposal.

"Legal Issues Associated with Battery Disposal," 22 pages, article by King & Spalding.

Primary Examiner—Mark Rosenbaum
Assistant Examiner—Frances Chin
Attorney, Agent, or Firm—Henry N. Garrana; John H. Bouchard

[57] ABSTRACT

A field transportable battery disposal unit comprises a storage drum containing a neutralizing fluid and a cutting apparatus adapted to sit on top of the drum, the cutting apparatus including a cutting wheel, a driving apparatus for rotating the cutting wheel, an oscillating apparatus for oscillating the cutting wheel in a "back and forth" motion, slots disposed adjacent the cutting wheel adapted to receive one or more of the exhausted batteries, a water pump for lubricating and cooling the cutting wheel and providing a pre-neutralizing spray of water to the wheel and battery parts, and an air scrubber for neutralizing an acid mist and exhausting the neutralized acid mist, contained within the drum, to the surrounding atmosphere. The battery is inserted into one of the slots in the cutting apparatus, and the cutting wheel cuts the battery into pieces. The water pump sprays water over the cutting wheel and on the battery parts undergoing the cutting operation. The remnants of the battery, cut by the cutting wheel, fall into the drum containing the neutralizing fluid.

16 Claims, 5 Drawing Sheets

TRANSPORTABLE BATTERY DISPOSAL UNIT

This is a continuation of application Ser. No. 07/714,957 filed Jun. 13, 1991 now abandoned.

BACKGROUND OF THE INVENTION

The subject matter of the present invention relates to a field transportable battery disposal unit adapted to be easily transported to any location where the use of batteries and their ultimate disposal is required.

Lithium batteries are often used at field locations near a wellsite. When the batteries are exhausted, it is necessary to safely dispose of the batteries. However, lithium batteries contain hazardous ingredients which preclude disposal in public landfills. The typical hazardous ingredients include lithium metal and corrosive electrolyte of which portions, depending on the state of discharge, still remain at end of battery useful life. The prior art method involving the safe disposal of these batteries required that the exhausted batteries be shipped to a central facility where, using large and expensive equipment, they were mechanically crushed and chemically neutralized, the remnants being discarded in a public landfill. The rationale for this approach is to breach and break open the internal cells in the battery packaging and expose the internal ingredients to a neutralizing solution, thus rendering the entire battery remnants safe for ultimate landfill disposal. However, the major disadvantage associated with this method concerns the use of the large and expensive equipment to crush and neutralize the batteries. Furthermore, due to regulatory constraints involving the shipment of the exhausted batteries, it is exceedingly difficult to ship the exhausted batteries to the central facility.

SUMMARY OF THE INVENTION

Accordingly, it is a primary object of the present invention to provide a field transportable battery disposal unit that is manually transportable from one location to another thereby enabling a user to safely discard exhausted batteries on location using the disposal unit and eliminating the need to transport the batteries to a central facility for subsequent disposal.

It is a further object of the present invention to provide the field transportable battery disposal unit, which unit functions to break the battery into pieces, to neutralize the remnants of the battery, and to provide a temporary storage location for the neutralized remnants of the exhausted batteries. This temporary storage location is also the site for an ongoing chemical neutralization process of the battery remnants. This process may take up to two weeks for complete neutralization depending on the amount and type of lithium batteries processed by the disposal unit.

It is a further object of the present invention to provide the field transportable battery disposal unit which breaks the battery into pieces, such as by cutting or squeezing the battery.

In accordance with these and other objects of the present invention, a field transportable battery disposal unit comprises a storage drum containing a neutralizing fluid and a breaking apparatus adapted to sit on top of the drum, the breaking apparatus including, in accordance with the preferred embodiment, a cutting apparatus. The cutting apparatus may include a cutting wheel, although it could also include any other means for opening the individual cells of the battery to allow neutralizing fluid to reach the interior of the cells, such as by a hydraulic cut or a hydraulic squeeze of the battery. The cutting apparatus further includes a driving apparatus for rotating the cutting wheel, an oscillating apparatus for oscillating the cutting wheel in a "back and forth" motion, slots disposed adjacent the cutting wheel adapted to receive one or more of the exhausted batteries, a water pump for lubricating and cooling the cutting wheel and providing a pre-neutralizing spray of water to the wheel and battery parts, and an air scrubber for neutralizing and exhausting any acid mist, contained within the drum, to the surrounding atmosphere. The battery is inserted into one of the slots in the cutting apparatus, and the cutting wheel cuts the battery into pieces. The water pump sprays water over the cutting wheel and on the battery parts undergoing the cutting operation thereby providing a preneutralizing spray to the battery parts. The remnants of the battery, cut by the cutting wheel, fall into the drum containing the neutralizing fluid. An acid mist exists within the drum between the cutting apparatus and the neutralizing fluid in the drum. In other battery chemistries containing either sulfur or non-sulfur bearing compounds, the water mist may be alkaline or acidic. The air scrubber draws the acid mist into a tube and into a neutralizing sponge disposed within the tube, the sponge neutralizing the acid in the mist. The sponge contains within itself either a basic or acid solution to neutralize the corresponding acid or alkaline mists. The air scrubber subsequently exhausts the neutralized mist to the surrounding atmosphere.

Further scope of applicability of the present invention will become apparent from the detailed description presented hereinafter. It should be understood, however, that the detailed description and the specific examples, while representing a preferred embodiment of the present invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein.

DETAILED DESCRIPTION OF THE PREFERRED EMBODIMENT

Figure 1:
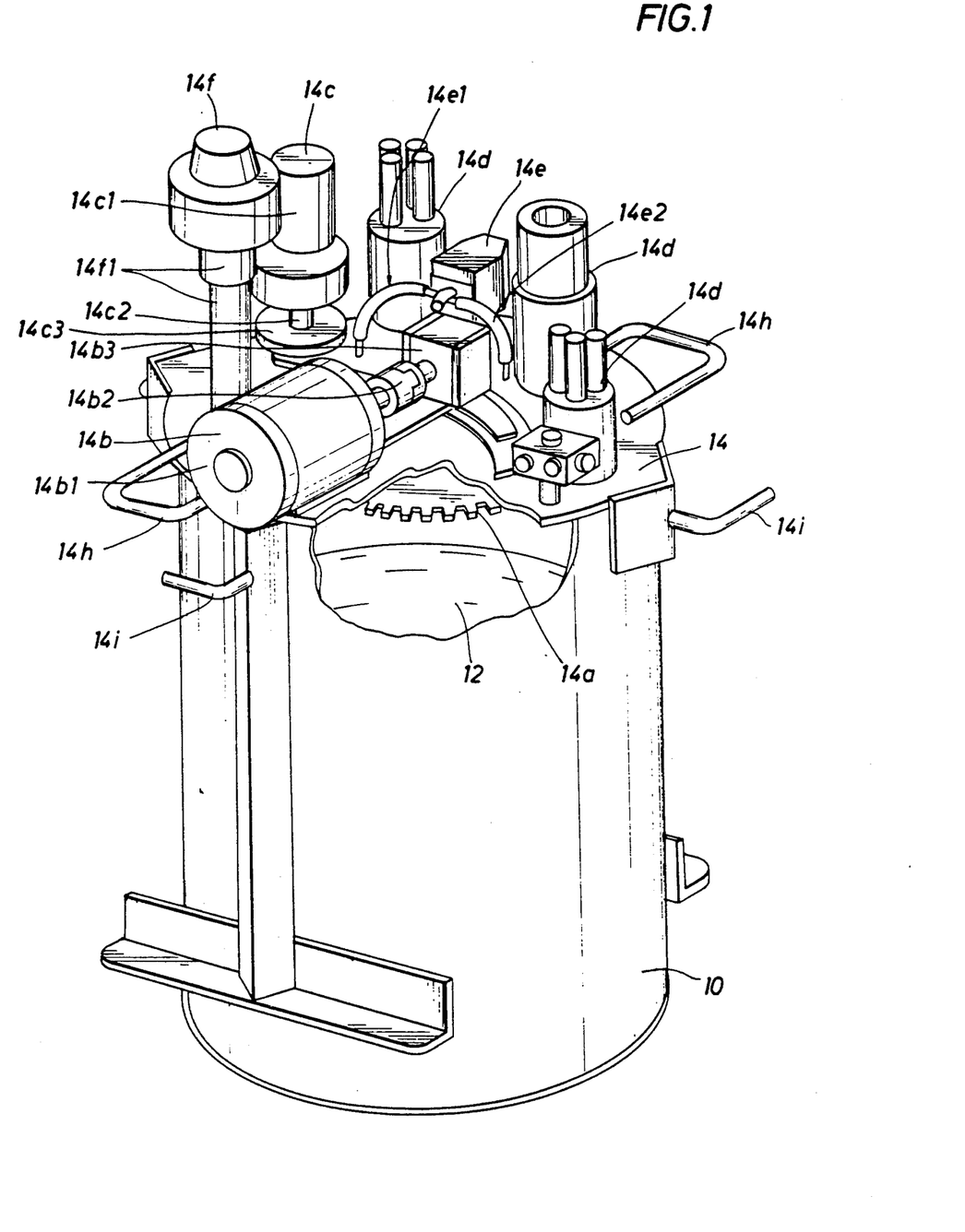
FIG. 1 illustrates a three dimensional view of the battery disposal unit of the present invention including the drum and cutting apparatus.

Referring to FIG. 1, a field transportable battery disposal unit is illustrated.

In FIG. 1, a storage drum 10 contains a neutralizing fluid 12 consisting of baking soda and water. Other neutralizing solutions (e.g., sea water) may be used to suit the particular battery chemistry (i.e., Li copper Oxide or li copper Oxyphosphate). A cutting apparatus 14 sits on top of the drum 10. The cutting apparatus 14 includes a 100 tooth carbide tipped cutting wheel 14a (other cutting wheels containing 60, 80, or 120 teeth may be used depending on the type of battery packaging to be cut); a driving apparatus 14b for rotating the cutting wheel 14a; an oscillating apparatus 14c for oscillating the cutting wheel 14a in a "back and forth" motion; slots 14d adapted to receive one or more exhausted batteries (having a diameter less than 4.3 inches); a water pump 14e for lubricating and cooling the cutting wheel and providing a preneutralizing spray of neutralizing fluid to the wheel, the water pump 14e including a receive tube 14e4 (see FIG. 2) having one end disposed within the neutralizing fluid and sending tubes 14e1, 14e2, and 14e3 having ends disposed above the cutting positions of the cutting wheel 14a (for illustrative purposes, only sending tubes 14e1 and 14e2 are shown in FIG. 1); an air scrubber 14f for neutralizing and exhausting an acid mist, contained within the drum 10, to the surrounding atmosphere; handles 14h for lifting the cutting apparatus 14 on top of the drum 10; and clamps 14i for clamping the cutting apparatus tightly to the top of the drum 10.

The driving apparatus 14b includes a motor 14b1 which rotates a drive shaft 14b2. The drive shaft 14b2 is connected to a gear box 14b3 wherein a set of gears transform the rotational movement of the drive shaft 14b2 into a corresponding rotational movement of another, second drive shaft 14b3(a) shown in FIG. 5 of the drawings. The second drive shaft 14b3(a) is connected to the cutting wheel 14a for rotating the cutting wheel 14a at approximately 1750 RPM in response to the corresponding rotational movement of the second drive shaft.

Figure 6:
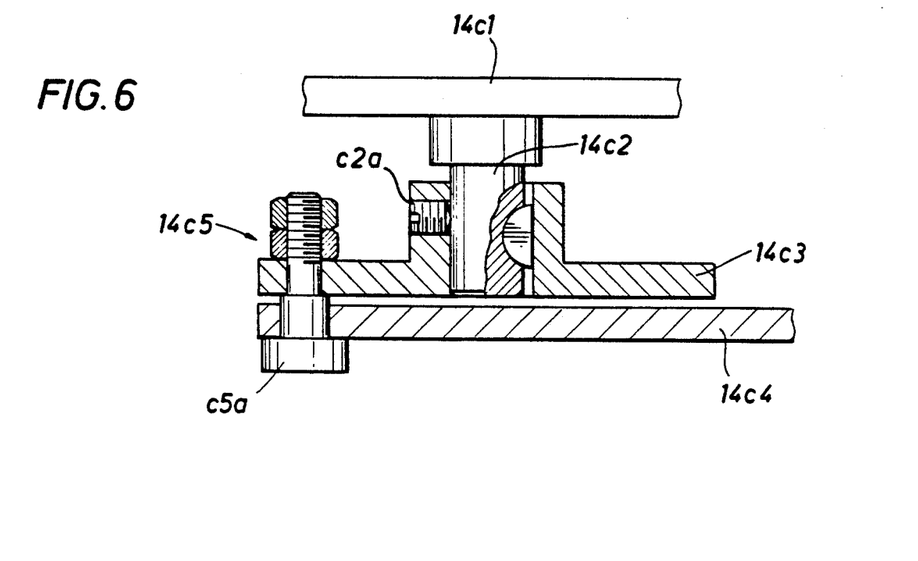
FIG. 6 illustrates a longitudinal cross sectional view of a portion of the oscillating apparatus, the portion including a drive shaft of a motor and a pitman arm connected to one end of the drive shaft.

The oscillating apparatus 14c includes a second motor 14c1 which rotates a further drive shaft 14c2, the rotational movement of the further drive shaft 14c2 slowly rotating a flywheel 14c3 at approximately 1 RPM. A pitman arm 14c4, shown in FIG. 6, is eccentrically connected to the flywheel 14c3. When the further drive shaft 14c2 rotates, the flywheel 14c3 also rotates; however, in view of the eccentric connection of the pitman arm 14c4 to the flywheel 14c3 (best shown in FIG. 6), rotation of the flywheel 14c3 will produce an oscillating (back and forth) movement of the pitman arm 14c4. The oscillating movement of the pitman arm 14c4 produces a corresponding "back and forth" oscillating movement of the gear box 14b3. This concept will be discussed in more detail below.

The water pump 14e forces lubricating fluid 12 to flow over the cutting wheel 14a as the batteries are cut. This serves four purposes: it lubricates the cutting wheel, extends blade life, reduces blade temperature and ensures that any lithium metal in the battery is removed by reaction with the sprayed fluid. Complete removal of the lithium metal from the cut battery is assured during the extended soak time of the battery remnants as they dwell in the enveloping neutralizing fluid of the drum 10.

The air scrubber 14f is a tube containing a fan that exhausts an acid or alkaline mist filled air existing within the drum 10 to the surrounding atmosphere. A sponge, contained within the tube, is impregnated with a neutralizing solution of water and baking soda (as one example), the sponge neutralizing the acid mist prior to exhausting the neutralized mist to the surrounding atmosphere.

Figure 2:
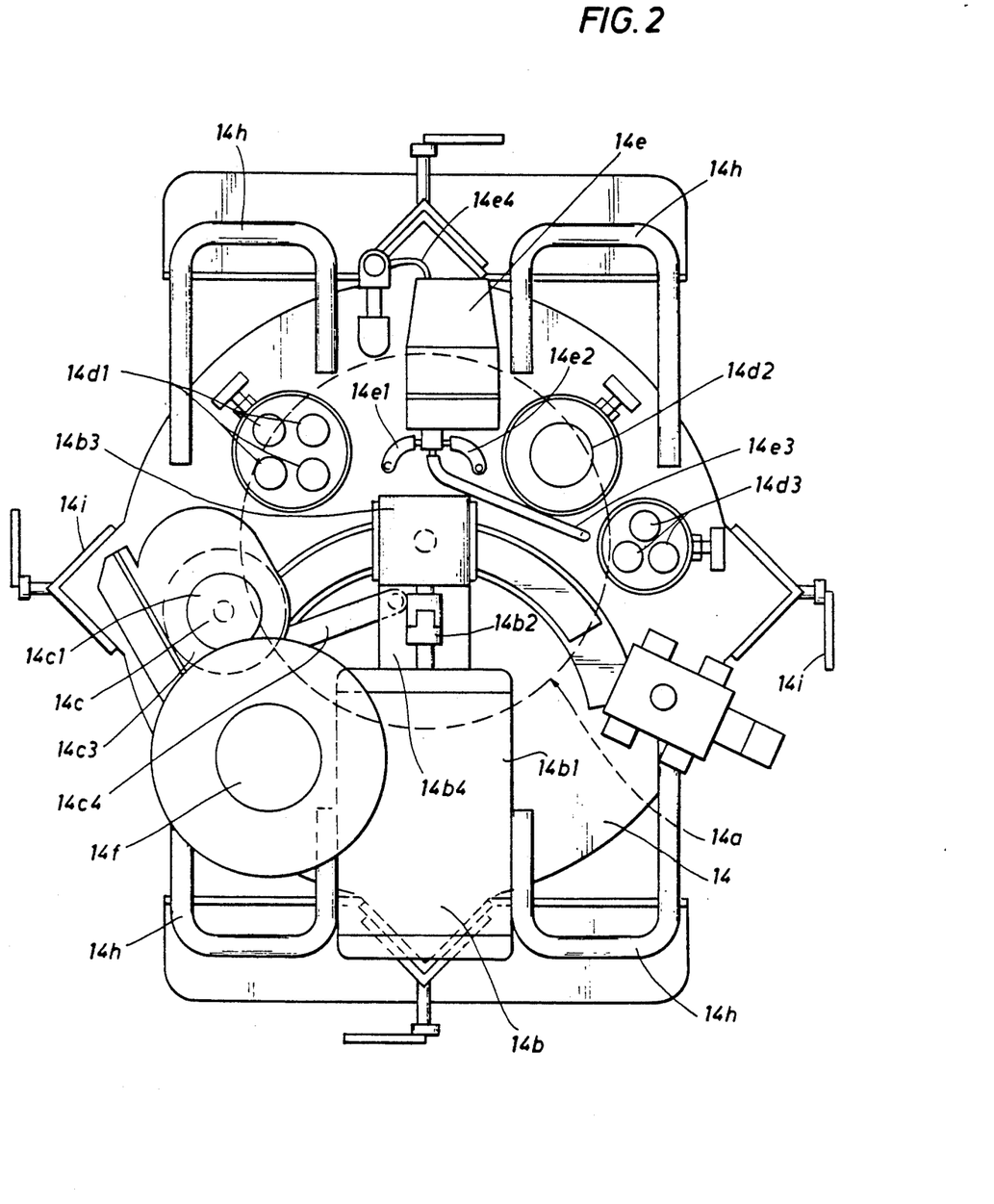
FIG. 2 illustrates a top view of the battery disposal unit and more particularly illustrating the cutting apparatus.

Referring to FIG. 2, a top view of the cutting apparatus 14 of FIG. 1 is illustrated.

In the top view, the cutting apparatus 14 comprises the cutting wheel 14a which is rotated at 1750 RPM by the driving apparatus 14b which, in FIG. 1, includes the motor 14b1, the drive shaft 14b2 driven by the motor 14b1, and the gear box 14b3 that transforms the rotational movement of the drive shaft 14b2 into rotational movement of drive shaft 14b3(a) (see FIG. 5), the drive shaft 14b3(a) rotating the cutting wheel 14a. In addition, the cutting apparatus 14 includes the oscillating apparatus 14c, which oscillating apparatus 14c includes a second motor 14c1 that rotates a flywheel 14c3 (see FIGS. 1 and 6). The pitman arm 14c4 is eccentrically connected to the flywheel 14c3 as illustrated in FIG. 6; therefore, rotational movement of the flywheel 14c3 causes the pitman arm 14c4 to oscillate in a "back and forth" motion. The pitman arm 14c4 is also connected to a base plate 14b4 on which the driving apparatus 14b is mounted; in particular, the pitman arm is connected to a portion of the base plate 14b4 which is located nearest the gear box 14b3 of the driving apparatus 14b. A clearer view of this connection may be seen in FIG. 3. Therefore, the back and forth oscillations of the pitman arm 14c4 in response to rotation of the flywheel 14c3 result in a corresponding "back and forth" oscillatory movement of the gear box 14b3 of the driving apparatus 14b. Three sets of slots 14d1, 14d2, and 14d3 are provided, in which the exhausted batteries are inserted prior to commencement of the cutting operation by the cutting apparatus 14. As a result, since the drive shaft 14b3(a) of the gear box 14b3 is connected to the cutting wheel 14a, when the gear box 14b3 oscillates back and forth, the cutting wheel 14a also oscillates in a back and forth motion; and, when the exhausted batteries are inserted within slots 14d1, 14d2, 14d3, the oscillating cutting wheel 14a will cut all batteries in each of the three slots into pieces, which pieces fall into the drum 10 containing the neutralizing fluid. In addition, the water pump 14e itself is connected to the receive tube 14e4 for receiving the neutralizing fluid 12 from the drum, and to the sending tubes 14e1, 14e2, and 14e3 for flowing the fluid onto the cutting wheel 14a during the cutting operation. The fluid cools and lubricates the cutting wheel during the cutting process. The air scrubber 14f includes a fan for exhausting an acid or alkaline mist, disposed within the drum, to the atmosphere; it also includes a sponge which is impregnated with a neutralizing fluid, the neutralizing fluid in the sponge neutralizing the acid or alkaline mist prior to exhaustion to the atmosphere.

Figure 3:
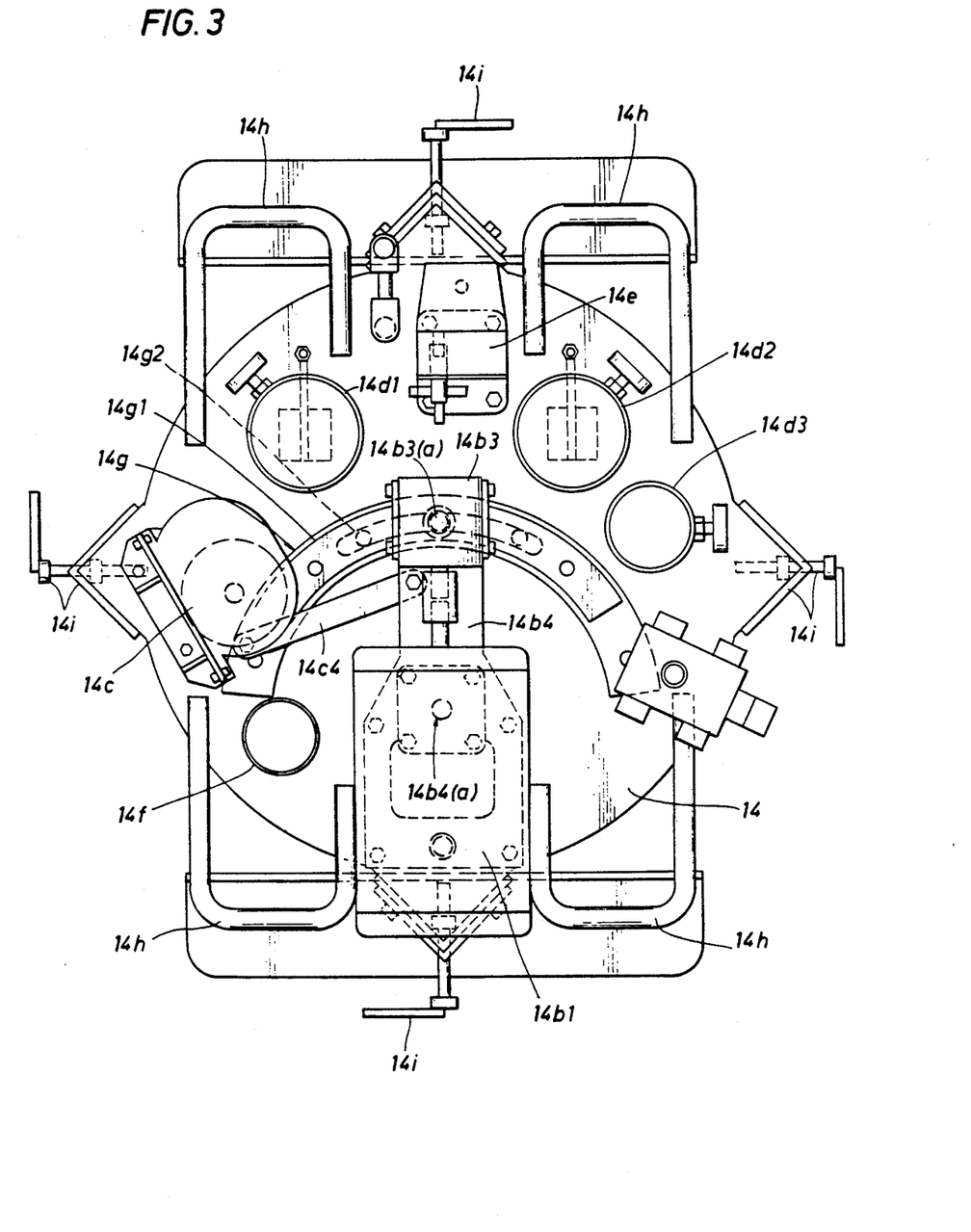
FIG. 3 illustrates a more detailed top view of the battery disposal unit and the cutting apparatus.

Referring to FIG. 3, another more detailed top view of the cutting apparatus 14 of FIGS. 1 and 2 is illustrated.

In FIG. 3, the second drive shaft 14b3(a) of the gear box 14b3 is disposed through an arc shaped slot 14g2 and connects to the cutting wheel 14a which is located below the cutting apparatus surface 14. Slot 14g2 defines the allowed travel of the second drive shaft 14b3(a) on the apparatus surface 14. Directly above slot 14g2 (better seen in FIG. 5) is affixed a plastic annular shaped plate 14g with greater arc length than slot 14g2. However, the annular plastic plate 14g has a corresponding arc shaped slot in it that exactly coincides with, and is situated directly above, slot 14g2. The second drive shaft 14b3(a) is also rigidly contained inside a metallic enclosure 14g1. This metallic enclosure 14g1 has an angular extension that fits over a portion of the annular shaped plastic plate 14g. The metallic enclosure 14g1 and second drive shaft 14b3(a) slide along the arc length of the fixed plastic plate 14g as the pitman arm 14c4 moves the gear box 14b3 in an oscillating "back and forth" motion. In this way, the slot opening 14g2 is always covered to prevent any corrosive fluids from spraying onto the top surface of the cutting apparatus 14. The base plate 14b4, on which the motor 14b1 of the driving apparatus 14b is mounted, is pinned at a focal point 14b4(a); therefore, when the gear box 14b3 moves back and forth in the oscillating motion, the entire driving apparatus 14b, and in particular, the motor 14b1, oscillates about the focal point 14b4(a).

Figure 4:
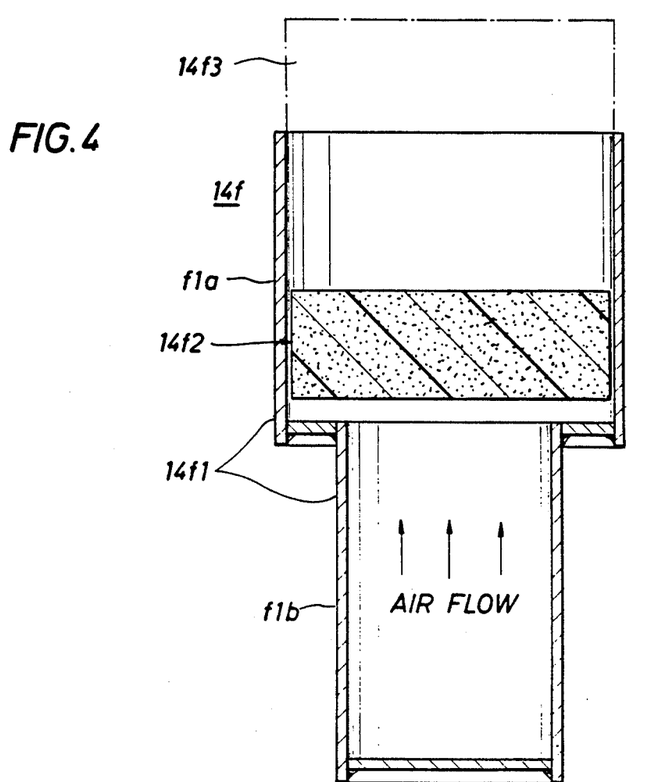
FIG. 4 illustrates a longitudinal cross sectional view of a tube supporting the air scrubber.

Referring to FIG. 4, a portion of the air scrubber 14f is illustrated.

In FIG. 4, the air scrubber 14f includes a right-angled section 14f1 (also shown in FIG. 1) that further includes a top section f1a and a bottom section f1b. A sponge 14f2 sits within the top section f1a of the right-angled section 14f1 of the air scrubber 14f. The sponge 14f2 is impregnated with a neutralizing fluid. A fan 14f3 is disposed on top of the right angled section 14f1, the fan withdrawing the acid or alkaline mist filled air, within the drum 10, to the surrounding atmosphere. As the acid or alkaline mist filled air is withdrawn from the drum 10 by the fan, the mist passes through the sponge 14f2; and, since the sponge is impregnated with a neutralizing fluid, the acid or base in the mist is neutralized prior to being exhausted to the atmosphere.

Figure 5:
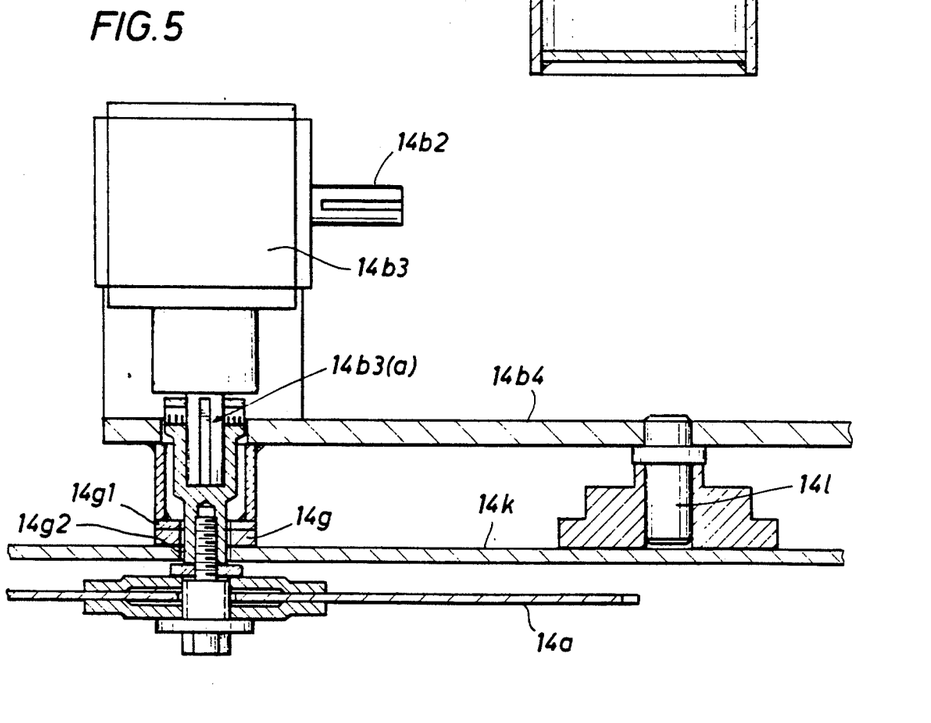
FIG. 5 illustrates a longitudinal cross sectional view of a portion of the driving apparatus including the cutting wheel and a gear box adapted to rotate the cutting wheel.

Referring to FIG. 5, a cross section of the cutting apparatus 14 is illustrated, FIG. 5 showing the gear box 14b3, the drive shaft 14b3(a) of the gear box, and the cutting wheel 14a.

In FIG. 5, the cutting apparatus 14 comprises a planar surface on which all of the above referenced various components associated with the cutting apparatus 14 are mounted. The planar surface includes two parallel surfaces: a top planar surface 14b4 (which is the base plate 14b4 referenced above) and a bottom planar surface 14k. FIG. 5 clarifies the relationship between the gearbox 14b3 and the cutting wheel 14a while FIG. 2 shows the relationship between the gearbox 14b3 and the driving motor assembly 14b. the bottom planar surface 14k is the actual surface of the disposal unit where all the components are attached. As shown in FIG. 5, surface 14k contains the annular slot 14g2 where the second drive shaft extends through to the cutting wheel 14a. A piece 14L maintains a separation between the top and bottom planar surfaces. Piece 14L of FIG. 5 is identical to the pivot point 14b4(a) of FIG. 3. It serves as the bearing surface for rotation of the entire top (base plate) surface 14b4 relative to the bottom fixed surface 14k. The second drive shaft 14b3(a) associated with the gear box 14b3 is clearly shown disposed through both top and bottom planar surfaces. The gear box 14b3 is disposed above the top planar surface 14b4 and the cutting wheel 14a, connected to the second drive shaft, is disposed below the bottom planar surface 14k. The drive shaft 14b2, associated with the driving apparatus 14b, is shown connected to the gear box 14b3 above the top planar surface 14b4. In operation, as the drive shaft 14b2 from the driving motor 14b1 rotates, the second drive shaft 14b3(a) also rotates. Since the cutting wheel 14a is connected to the second drive shaft 14b3(a), rotation of the second drive shaft causes a corresponding rotation of the cutting wheel 14a.

Referring to FIG. 6, a cross sectional view of the oscillating apparatus 14c is illustrated, the cross sectional view showing the drive shaft 14c2 from motor 14c1, its connection to the flywheel 14c3, and, in particular, the connection of pitman arm 14c4 to the flywheel 14c3.

FIG. 1 shows the oscillating apparatus 14c as including a motor 14c1, a drive shaft 14c2 extending from the motor, and a flywheel 14c3 connected to the drive shaft 14c2. In FIG. 6, the pitman arm 14c4 is eccentrically connected to the flywheel 14c3. The words "eccentrically connected" refers to the location on flywheel 14c3 where the pitman 14c4 makes its connection; that is, the pitman arm 14c4 is connected, at location 14c5, to the extreme left hand portion of the flywheel 14c3. A bolt c5a connects the pitman arm to the flywheel 14c3 at location 14c5. The flywheel 14c3, itself, is connected to drive shaft 14c2 of motor 14c1 via set screws c2a. In operation, as drive shaft 14c2 rotates, the flywheel 14c3 rotates. Since the pitman arm 14c4 is eccentrically connected to flywheel 14c3 at location 14c5, rotation of the flywheel 14c3 causes the pitman arm 14c4 to oscillate in a "back and forth" motion.

A functional description of the transportable battery disposal unit in accordance with the present invention will be set forth in the following paragraphs with reference to FIGS. 1-6 of the drawings.

The cutting apparatus 14 is lifted by handles 14h and placed on top of a storage drum 10 in which a neutralizing fluid 12 (e.g., baking soda and water) is stored. Batteries, which are exhausted and which require disposal, are inserted into slots 14d of FIG. 1, which include slots 14d1, 14d2 and 14d3 of FIG. 2. Power is delivered to motor 14b1 of the driving apparatus 14b, to motor 14c1 of oscillating apparatus 14c, to water pump 14e, and to the fan disposed within air scrubber 14f. When the power is delivered to motor 14b1 of the driving apparatus 14b, drive shaft 14b2 rotates. Gear box 14b3 transforms the rotational movement of drive shaft 14b2 into a corresponding rotational movement of second drive shaft 14b3(a). As the second drive shaft 14b3(a) rotates, the cutting wheel 14a also rotates at 1750 RPM. However, in view of the eccentric connection of the pitman arm 14c4 to flywheel 14c3, as shown in FIG. 6, when power is simultaneously delivered to motor 14c1 of the oscillating apparatus 14c, the drive shaft 14c2 rotates, the flywheel 14c3 rotates in response thereto, and the pitman arm 14c4 moves transversely, in an oscillating "back and forth" motion. Since the pitman arm 14c4 is connected to base plate 14b4 nearest gear box 14b3, the oscillating motion of the pitman arm 14c4 also causes the gear box 14b3 to move transversely, in an oscillating "back and forth" motion. Since the gear box 14b3 is connected to the cutting wheel 14a via drive shaft 14b3(a) as shown in FIG. 5, the oscillating motion of the gear box 14b3 also causes the cutting wheel 14a to move transversely, in an oscillating "back and forth" motion. As best shown in FIG. 2, during the transverse oscillating motion of the cutting wheel 14a, the periphery of the cutting wheel 14a intersects and cuts each of the batteries disposed in slots 14d1, 14d2, and 14d3. The batteries are cut into arbitrarily small pieces, and the pieces fall into the neutralizing fluid 12 within the storage drum 10. During the cutting operation, an acid or alkaline mist forms within the storage drum 10. The fan within air scrubber 14f withdraws the acid or base mist into the right angled section 14f1 shown in FIG. 4. The sponge 14f2 receives the acid mist and, in view of the neutralizing fluid disposed within the sponge 14f2, neutralizes the acid or base in the mist. The fan in the air scrubber 14f exhausts the neutralized mist to the surrounding atmosphere. During the cutting operation, the water pump 14e pumps the neutralizing fluid 12 from the storage drum 10 into the receive tube 14e4 and subsequently pumps the neutralizing fluid 12 into the sending tubes 14e1, 14e2, and 14e3 wherein the fluid 12 flows over the cutting wheel 14a. The fluid 12 from the sending tubes 14e1, 14e2, & 14e3 cools and lubricates the cutting wheel 14a and it performs the first stage of neutralization of the remnants. The complete neutralization occurs after the remnants have soaked in the drum for an extended period of time. The required soak duration depends on the incoming state of battery exhaustion, type of batteries cut, and amount of batteries cut. In addition, soak time is dependent on the thickness of the cut. Thinner cuts allow for a more efficient permeation of neutralizing solution to the remnants interior and, therefore, take less soak time than thicker cut remnants.

Figure 7:
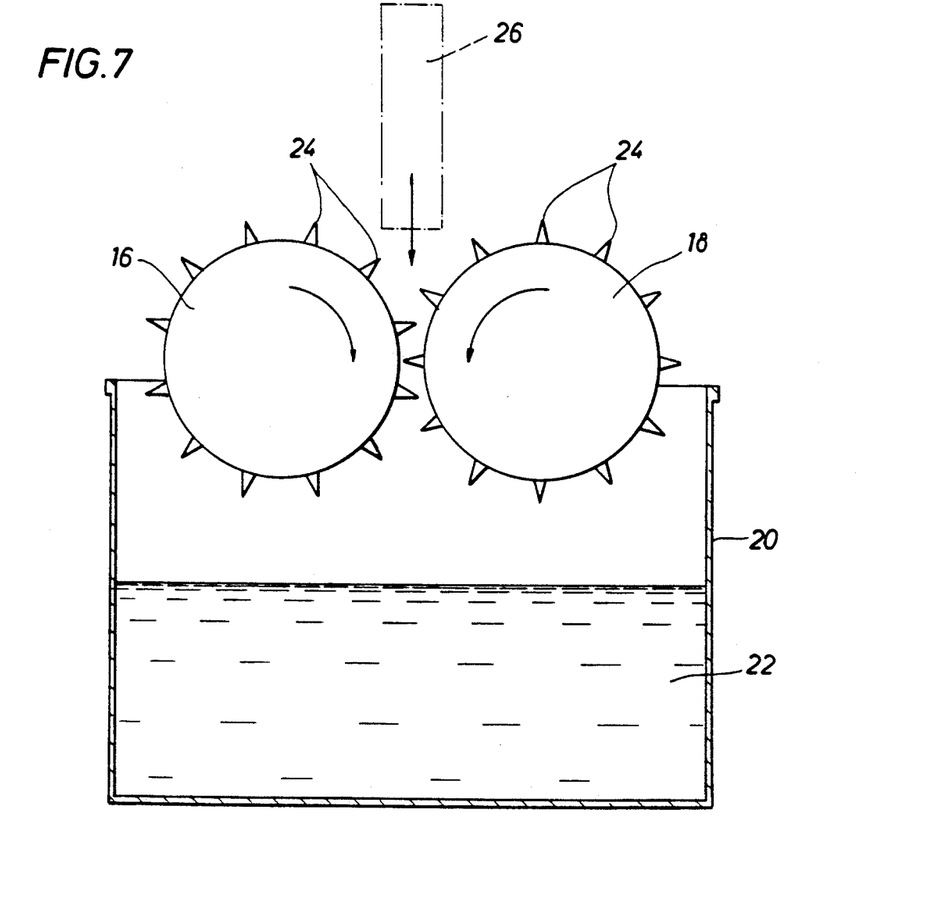
FIG. 7 illustrates another embodiment of the cutting apparatus in accordance with the present invention, this embodiment illustrating another method for cutting the exhausted batteries.

Referring to FIG. 7, another embodiment of the present invention is illustrated.

In FIG. 7, two cutting wheels 16 and 18 are disposed over a drum 20 containing a neutralizing solution of baking soda and water 22. The two cutting wheels 16 and 18 rotate in different direction, one clockwise, and the other counterclockwise. Each cutting wheel 16 and 18 includes a plurality of cutting teeth 24 disposed around the periphery thereof. A battery 26 is adapted to be lowered in-between the two cutting wheels. In operation, as the battery 26 is lowered in between each cutting wheel 16 and 18, the cutting teeth 24 on each wheel perform two functions: (a) cut the battery 26 into small pieces, the pieces falling into the neutralizing solution 22, and (b) provide a means to pull the battery further into the intermeshing cutting wheels.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim;

1. A transportable object disposal unit, comprising:
a container holding a fluid; and
a lid for said container, said lid including a plurality of holes for receiving a respective plurality of objects when said lid is disposed over said container, said lid being disposed in a first plane when said lid is disposed over said container, said plurality of holes lying in said first plane; and
breaking apparatus means disposed in a second plane which is located below said first plane and is substantially parallel to said first plane when said lid is disposed over said container for breaking said plurality of objects into pieces when the plurality of objects are received, respectively, in the plurality of holes in said lid and said lid is disposed over said container, said fluid in said container neutralizing said pieces of said objects broken by said breaking apparatus,
said breaking apparatus means including cutting means disposed in said second plane for cutting said objects into pieces, said cutting means including,
a cutting wheel disposed in said second plane which is located below said first plane and is substantially parallel to said first plane when said lid is disposed over said container, and
driving means operatively connected to said cutting wheel for driving said cutting wheel thereby cutting said objects into said pieces, said driving means including rotating means for rotating said cutting wheel, and oscillating means for moving said cutting wheel transversely within said second plane in an oscillating manner along a path of travel when said rotating means is rotating said cutting wheel, said path of travel being defined by a path taken in said first plane by the plurality of objects when said objects are disposed through the holes in the lid,
a first one of said plurality of objects being disposed in said first plane at one point along said path of travel of said oscillating means in said second plane and a last one of said plurality of objects being disposed in said first plane at another point along said path of travel of said oscillating means in said second plane, said cutting wheel cutting said first one of said plurality of objects when said oscillating means moves said cutting sheet within said second plane along said path of travel to said one point along said path, said cutting wheel cutting said last one of said plurality of objects when said oscillating means moves said cutting wheel within said second plane along said path of travel to said another point along said path.

2. The disposal unit of claim 1, wherein said lid further comprises:
pump means for pumping said fluid from said container and flowing the pumped fluid over said cutting wheel when the cutting wheel is rotated by said rotating means.

3. The disposal unit of claim 1, wherein air is disposed between said lid and said fluid in said container when said lid is disposed on top of said container, and wherein said lid further comprises:
exhaust means for controlling the exhaustion of said air to a surrounding atmosphere.

4. The disposal unit of claim 3, wherein said exhaust means comprises a neutralizing means for neutralizing said air when said air is being exhausted to said atmosphere by said exhaust means.

5. The disposal unit of claim 4, wherein said lid further comprises:
pump means for pumping said fluid from said container and flowing the pumped fluid over said cutting wheel when the cutting wheel is rotated by said rotating means.

6. The disposal unit of claim 5, where each of said plurality of objects comprise a battery.

7. A transportable battery disposal unit, comprising:
a container holding a fluid; and
a lid for said container, said lid including a plurality of holes for receiving a respective plurality of batteries when sad lid is disposed over said container, said lid being disposed in a first plane when said lid is disposed over said container, said plurality of holes lying in said first plane; and breaking apparatus means disposed in a second plane which is located below said first plane and is substantially parallel to said first plane when said lid is disposed over said container for breaking said plurality of batteries into pieces when said plurality of batteries are received, respectively, in the plurality of holes in said lid and said lid is disposed over said container, said fluid in said container neutralizing said pieces of said batteries broken by said breaking apparatus, said breaking apparatus means including cutting means disposed in said second plane for cutting said batteries into pieces, said cutting means including, a cutting wheel disposed in said second plane which is located below said first plane and is substantially parallel to said first plane when said lid is disposed over said container, and driving means operatively connected to said cutting wheel for driving said cutting wheel thereby cutting said batteries into said pieces, said driving means including rotating means for rotating said cutting wheel, and oscillating means for moving said cutting wheel transversely within said second plane in an oscillating manner along a path of travel when said rotating means is rotating said cutting wheel, said path of travel being defined by a path taken in said first plane by the plurality of batteries when said batteries are disposed through the holes in the lid, a first one of said plurality of batteries being disposed in said first plane at one point along said path of travel of said oscillating means in said second plane and a last one of said plurality of batteries being disposed in said first plane at another point along said path of travel of said oscillating means in said second plane, said cutting wheel cutting said first one of said plurality of batteries when said oscillating means moves said cutting wheel within said second plane along said path of travel to said one point along said path, said cutting wheel cutting said last one of said plurality of batteries when said oscillating means moves said cutting wheel within said second plane along said path of travel to said another point along said path.

8. The battery disposal unit of claim 7, further comprising:

pump means for pumping said fluid from said container and flowing the pumped fluid over said cutting wheel when said driving means drives said cutting wheel.

9. The battery disposal unit of claim 8, wherein an acid mist exists between said fluid in said container and said cutting wheel, further comprising:

exhaust means for exhausting said acid mist to a surrounding atmosphere.

10. The battery disposal unit of claim 9, wherein said exhaust means includes neutralizing means for neutralizing said acid mist during the exhaustion of said mist to said atmosphere.

11. A transportable object disposal unit, comprising:

a container holding a fluid; and a lid for said container, said lid including a plurality of holes for receiving a respective plurality of objects when said lid is disposed over said container, said lid being disposed in a first plane when said lid is disposed over said container, said plurality of holes lying in said first plane; and breaking apparatus means disposed in a second plane which is located below said first plane and is substantially parallel to said first plane when said lid is disposed over said container for breaking said plurality of objects into pieces when the plurality of objects are received, respectively, in the plurality of holes in said lid and said lid is disposed over said container, said pieces falling into said fluid in said container when said pieces are broken by said breaking apparatus means, said breaking apparatus means including oscillating means for moving said breaking apparatus means in an oscillating manner within said second plane along a path of travel when said breaking apparatus means is breaking said objects into pieces, said path of travel being defined by a path taken in said first plane by the plurality of objects when said objects are disposed through the holes in the lid, a first one of said plurality of objects being disposed in said first plane at one point along said path of travel of said oscillating means in said second plane, a last one of said plurality of objects being disposed in said first plane at another point along said path of travel of said oscillating means in said second plane, said breaking apparatus means breaking said first one of said plurality of objects when said oscillating means moves said breaking apparatus means within said second plane along said path of travel to said one point along said path, said breaking apparatus means breaking said last one of said plurality of objects when said oscillating means moves said breaking apparatus means within said second plane along said path of travel to said another point along said path.

12. The object disposal unit of claim 11, wherein said breaking apparatus means includes cutting means for cutting said objects into said pieces and driving means for driving said cutting means, said one of said plurality of objects and said another of said plurality of objects being broken into said pieces when the driving means drives said cutting means and said oscillating means moves said cutting means in said oscillating manner within said second plane along said path of travel between said one point along said path to said another point along said path.

13. The object disposal unit of claim 12, wherein said cutting means comprises a cutting wheel, said driving means comprises a rotating means for rotating said cutting wheel, said oscillating means moving said cutting wheel in said oscillating manner within said second plane between said one point and said another point along said path of travel, said one of said plurality of objects and said another of said plurality of objects being broken into said pieces when the rotating means rotates said cutting wheel and said oscillating means moves said cutting wheel in said oscillating manner within said second plane between said one point and said another point along said path of travel.

14. The object disposal unit of claim 13, further comprising:

pump means for pumping said fluid from said container and flowing the pumped fluid over said cutting wheel when said rotating means rotates said cutting wheel.

15. The object disposal unit of claim 14, wherein an acid mist exists between said fluid in said container and said cutting wheel, further comprising:

exhaust means for exhausting said acid mist to a surrounding atmosphere.

16. The object disposal unit of claim 15, where said exhaust means includes neutralizing means for neutralizing said acid mist during the exhaustion of said mist to said atmosphere.

* * * * *